United States Patent [19]
Richards

[11] Patent Number: 4,858,026
[45] Date of Patent: Aug. 15, 1989

[54] IMAGE DISPLAY

[75] Inventor: Norman D. Richards, Horsham, England

[73] Assignee: U.S. Philips Corporation, New York, N.Y.

[21] Appl. No.: 135,876

[22] Filed: Dec. 21, 1987

Related U.S. Application Data

[63] Continuation-in-part of Ser. No. 35,104, Apr. 6, 1987.

[30] Foreign Application Priority Data

Dec. 24, 1986 [GB] United Kingdom ................ 8630887
Apr. 14, 1987 [GB] United Kingdom ................ 8609078

[51] Int. Cl.$^4$ ...................... H04N 7/137; H04N 11/04
[52] U.S. Cl. ...................................... 358/310; 358/13; 358/135
[58] Field of Search ................... 358/135, 13, 12, 310; 340/703

[56] References Cited

U.S. PATENT DOCUMENTS

| | | | |
|---|---|---|---|
| 3,035,121 | 5/1962 | Schreiber | 358/135 |
| 4,158,837 | 6/1979 | Zahorsky et al. | 340/804 |
| 4,554,670 | 11/1985 | Aiko et al. | 358/135 |
| 4,613,894 | 9/1986 | Catros et al. | 358/135 |
| 4,665,436 | 5/1987 | Osborne et al. | 358/135 |
| 4,727,497 | 2/1988 | Peters et al. | 364/518 |
| 4,758,831 | 7/1988 | Kasahara et al. | 340/805 |

OTHER PUBLICATIONS

Burt, Peter J. et al, The Laplacian Pyramid as a Compact Image Code, Apr. 19, 1983, IEEE Transactions on Communications, vol. COM-31, No. 4, pp. 532–540.

Primary Examiner—John W. Shepperd
Attorney, Agent, or Firm—Thomas A. Briody; Jack E. Haken; Jack D. Slobod

[57] ABSTRACT

Pixel information representing an image for display is coded using data compression. The data compression consists in obtaining the pixel information as a first matrix of high resolution pixel values, subtracting from this first matrix a second matrix composed of lower resolution pixel values, produced by low pass filtering the first matrix, to produce a third matrix of difference values, sub-sampling the second matrix to produce a fourth matrix of less density lower resolution pixel values and coding the third and fourth matrices. Complementary decoding consists in restituting the second matrix by interpolation filtering the decoded fourth matrix, and combining the restituted second matrix with the decoded third matrix. Loss of accuracy in the decoding method is reduced by coding and then decoding the fourth matrix during the coding method before it is interpolated to full pixel density to form the restituted second matrix which is subtracted from the first matrix to produce the third matrix of difference values. In this way, any sub-sampling and interpolation errors in the restituted fourth matrix occur in both the coding method and the decoding method and therefore cancel out.

17 Claims, 3 Drawing Sheets

IMAGE DISPLAY

This application is a continuation-in-part of application Ser. No. 035,104, filed Apr. 6, 1987.

BACKGROUND OF THE INVENTION

1. Field of the Invention

This invention relates to image display and more particularly to a method of image to be displayed coding by which pixel information for an image is coded into digital data. The invention further relates to to the recording of said data on a suitable storage medium and to apparatus for carrying out such a coding method.

2. Description of the Prior Art

In a typical electronic image display apparatus, an image which is displayed on the screen of a CRT (cathode ray tube) or other display device is composed of discrete pixels each of which is represented by a respective digital code which defines a pixel in terms of chrominance and luminance pixel component values. Each of these digital codes is stored in a display memory which is addressed periodically in synchronism with the operation of the display device to read out the digital codes which are used to produce video signals for driving the display device. The display produced by electronic image display apparatus of the above type is termed a bit-map display and has, for example, a resolution of 360×280 pixels. The apparatus can include a background memory in which is stored the pixel information for a large number of images. When a displayed image is to be replaced by a new image, the pixel information for the new image is made available in the display memory as the respective digital codes which represent the pixel component values for the new image. The pixel information can be stored in the background memory as the actual respective digital codes which represent the pixel component values, so that the digital codes for the new image can be read out from the background memory and written directly into the display memory in place of the digital codes for the previously displayed image.

The time taken for this read/write operation in respect of the digital codes for the new image depends inter alia upon the operating speed (i.e. the speed of data access) of the background memory. When the background memory is a mass memory, such as an optical record carrier (i.e. a compact disc) in its role as a read only memory (CD ROM), its operating speed may be too low for certain applications. In particular, it has been determined empirically that a user of image display apparatus of the above type will tolerate a delay of only about one second for replacing a displayed image by a new image. If the delay is significantly longer, then use of the apparatus becomes aesthetically unacceptable. As a consequence, the amount of pixel information that can be transferred from the background memory to the display memory to change the image being displayed becomes limited.

It has been found that such a limitation poses a problem in respect of enhanced resolution displays which require a large amount of pixel information. A CD ROM can readily provide the storage capacity which is necessary, but accessing this pixel information sufficiently quickly has proven to be difficult. As an example, for a normal resolution image display using a 360×280 pixel matrix, as aforesaid, the time taken to load digital codes representing pixel component values from a CD ROM into a display memory is thought to be on the margin of user acceptability. However, for an enhanced resolution image display using a 720×560 pixel matrix, (i.e. having a quadruple number of pixels), which is contemplated, the loading of digital codes representing pixel component values will take four times longer, which is unacceptable.

DESCRIPTION OF APPLICANT'S PRIOR APPLICATION

In order to provide a more efficient form of coding for at least one pixel component value of a plurality of pixels to reduce the amount of digital data that is required to be stored to provide enhanced resolution image displays, Applicants prior British Patent Application No. 8609078, which corresponds to U.S. Application Ser. No. 035,104, filed Apr. 6, 1987, describes a method of image coding which comprises the steps of:

(a) obtaining pixel information as a first matrix of $m \times n$ pixel component values, where m and n are integers, (b) low-pass filtering these pixel component values of the first matrix to produce a second matrix of $m \times n$ pixel component values which are in respect of a lower resolution image compared with the pixel component values of the first matrix, (c) subtracting the second matrix from the first matrix pixel-by-pixel to produce a third matrix of $m \times n$ difference values, which have reduced pixel-to-pixel correlation compared with the pixel component values of the first matrix, (d) coding said third matrix of difference values into a first set of digital data for storage on a storage medium, (e) sub-sampling said second matrix of pixel component values to produce a fourth matrix of $m/a \times n/b$ pixel component values of reduced density, where a and b are factors of m and n, respectively, and (f) coding said fourth matrix of pixel component values into a second set of digital data for storage on a storage medium.

A complementary method of decoding the digital data obtained by the above coding method, to restitute the original pixel information, is also described in the aforementioned patent application and comprises the steps of:

(g) decoding the first set of digital data representing the difference values to reconstitute the third matrix of difference values, (h) decoding the second set of digital data representing the pixel component values of reduced density to reconstitute the fourth matrix of pixel component values, (i) interpolation filtering said fourth matrix of pixel component values to restitute said second matrix of pixel component values, and (j) adding pixel-by-pixel the reconstituted third matrix and the restituted second matrix to restitute said first matrix, the pixel component values of which represent the original pixel information.

Therefore, in summary, Applicant's aforementioned prior patent application describes a method whereby a high resolution image is coded as a lower resolution image of reduced pixel density. Additional coding produces extra data representative of the difference between the high resolution image and the lower resolution image before pixel reduction. On decoding, this extra data is subsequently combined with data representing the restituted lower resolution image so as to restore for display an image which approximates to the original high resolution image.

FIGS. 1 and 2 of the accompanying drawings are representative diagrams of Applicant's prior coding and decoding methods, respectively.

The representative diagram in FIG. 1 of the coding method shows a low-pass filtering step 1, a sub-sampling step 2, a difference step 3, a first coding step 4 and a second coding step 5. Pixel information for at least one component value of a plurality of pixels representing an image is applied to the low-pass filtering step 1 and also to the difference step 3. This pixel information is assumed by way of illustrative example to comprise a first matrix M1 of 720×560 pixel component values (HI). This pixel information is in respect of an enhanced resolution display which would be better than both standard 625 line camera resolution and studio quality and would require a high definition television screen for displaying the image concerned at full resolution.

The low-pass filtering step 1 effects low pass filtering to produce a second matrix M2 of 720×560 pixel component values (LO) which are in respect of a lower resolution image compared with the pixel component values of the first matrix M1. The difference step 3 subtracts the second matrix M2 from the first matrix M1, pixel-by-pixel, to produce a third matrix M3 of 720×560 difference values (DI) which are coded by the first coding step 4 into a first set of resultant digital data RDD1. The sub-sampling step 2 takes every second pixel component value of the second matrix M2, both horizontally and vertically, to produce a fourth matrix M4 of 360×280 pixel component values (NO) of reduced pixel density. The pixel information represented by this fourth matrix M4 is in respect of a normal resolution display. The second coding step 5 codes the pixel component values of the fourth matrix M4 into a second set of resultant digital data RDD2. The pixel component values of the matrices M1 to M4 can be conventional pulse code modulated (PCM) data. The set of data RDD1 can be the result of quantising and run-length coding the PCM data of the matrix M3 and the set of data RDD2 can be the result of delta coding the PCM data of the matrix M4. The two sets of digital data RDD1 and RDD2 are available for storage on a suitable storage medium SM.

The representative diagram in FIG. 2, of the decoding method shows a first decoding step 6, a second decoding step 7, an interpolation filtering step 8, and an addition step 9.

The first set of digital data RDD1 as read from the storage medium SM, is applied to the decoding step 7 which produces a reconstituted matrix M3′ of 720×560 difference values (DI). The second set of digital data RDD2 as read from the storage medium SM, is decoded by the decoding step 6 and applied to the interpolation filtering step 8 as the reconstituted fourth matrix M4′, of 360×280 pixel component values (NO). The interpolation filtering step 8 produces a restituted second matrix M2′ of 720×560 pixel component values (LO). The two matrices M2′ and M3′ are applied to the addition step 9 which produces a restituted first matrix M1′ of 720×560 pixel component values (HI). This restituted first matrix M1′ constitutes resultant pixel information which can be used in respect of a high resolution display of the original image. The reconstituted fourth matrix M4′ can be used in respect of a normal (lower) resolution display of the original image.

Because for Applicant's prior coding and decoding methods the actual pixel component values of the second filtered matrix M2, but only the corresponding decoded and interpolated pixel component values of the restituted second matrix M2′, it has been found that there is a loss of accuracy in the decoding method when the restituted second matrix M2′ is added to the reconstituted matrix M3′ of difference values to produce the restituted first matrix M1′ corresponding to the original first matrix M1.

It is an object of the present invention to provide an improved coding method which avoids this limitation in a complementary decoding method.

SUMMARY OF THE INVENTION

According to the invention a method of image coding by which pixel information for at least one pixel component value of a plurality of pixels forming an image is coded into digital data which can be recorded on a suitable storage medium, comprises the steps of:
(i) obtaining said pixel information as a first matrix of m×n pixel component values, where m and n are integers,
(ii) low-pass filtering these pixel component values of the first matrix to produce a second matrix of m×n pixel component values, which are in respect of a lower resolution image compared with the pixel component values of the first matrix,
(iii) sub-sampling said second matrix of pixel component values to produce a fourth matrix of m/a×n/b pixel component values of reduced density, where a and b are factors of m and n, respectively, and
(iv) coding said fourth matrix of pixel component values into a second set of digital data for storage on a storage medium;
said method being characterised by comprising the further steps of:
(v) decoding the second set of digital data representing the pixel component values of reduced density to reconstitute the fourth matrix of pixel component values,
(vi) interpolation filtering said reconstituted fourth matrix of pixel component values to restitute said second matrix of pixel component values,
(vii) subtracting the restituted second matrix from the first matrix pixel-by-pixel to produce a third matrix of m×n difference values, and
(viii) coding said third matrix of difference values into a first set of digital data for storage on a storage medium.

With this improved method of coding, the second matrix which is subtracted from the first matrix to produce the third matrix of difference values, is a restituted second matrix which is substantially identical to the restituted second matrix which is added to the reconstituted third matrix in the complementary decoding method set forth above in order to restore the original pixel information. Therefore the restored original pixel information is made independent of the subsequent coding and interpolation errors, because these errors are now also introduced into the coding method. As a consequence, the restored original pixel information is subject only to errors resulting from coding the third matrix of difference values.

The coding method according to the above steps (i) to (viii) can include the further step (ix) of recording the digital data produced by steps (iv) and (viii) onto a storage medium.

In carrying out the coding method, the low-pass filtering of the pixel component values of the first matrix in step (ii), and the sub-sampling of the pixel component values of the second matrix in step (iii) can both be by a factor of two both horizontally and vertically. This enables the reconstituted fourth matrix of pixel component values of a subsequent decoding method to be used directly in respect of pixel information for a normal (lower) resolution display.

In carrying the present invention into effect, the considerations concerning data compression are the same as those discussed in Applicant's aforementioned prior patent application.

In the coding method according to the invention, the coding of the difference values into the first set of digital data preferably consists in quantizing these difference values into a smaller number of quantized values, including zero, and coding the quantized values using a run-length code. The quantization levels which are used also form part of the first set of digital data. These levels can be chosen so as to best match particular images. Alternatively, a fixed set of quantization levels may be used which is optimised for a range of image sources. Such quantisation can, of course, give rise to errors to which the restored original pixel information would be subject.

Further data compression can be realised in the coding of the fourth matrix of pixel component values into the second set of digital data for storage as dealt with by step (iv). This further compression is also based on the fact that natural images have a correlation and, typically, graceful boundary transitions. This means that delta coding rather than absolute coding for a finite bandwidth can give a significant improvement in compression whilst maintaining picture quality.

Therefore, in the coding method according to the invention, the coding of the pixel component values of the fourth matrix into the second set of digital data preferably consists in delta coding these pixel component values.

It will of course be apparent that when the coding method employs these coding techniques, a subsequent decoding method will include complementary decoding techniques.

A coding arrangement according to the invention comprises:
  means for obtaining pixel information for at least one pixel component value of a plurality of pixels forming an image as a first matrix of m×n pixel component values, where m and n are integers,
  means for low-pass filtering these pixel component values of the first matrix to produce a second matrix of m×n pixel component values, which are in respect of a lower resolution image compared with the pixel component values of the first matrix,
  means for sub-sampling said second matrix of pixel component values to produce a fourth matrix of m/a×n/b pixel component values of reduced density, where a and b are factors of m and n, respectively,
  means for coding said fourth matrix of pixel component values into a second set of digital data for storage on a storage medium.
  means for decoding the second set of digital data to reconstitute the fourth matrix of pixel component values,
  means for interpolation filtering said reconstituted fourth matrix of pixel component values to restitute said second matrix of pixel component values,
  means for subtracting the restituted second matrix from the first matrix pixel-by-pixel to produce a third matrix of m×n difference values, and
  means for coding said third matrix of difference values into a first set of digital data for storage on a storage medium.

The coding arrangement can include further means for recording the resultant digital data onto a storage medium.

In the coding arrangement, the means for low-pass filtering the pixel component values of the first matrix and the means for sub-sampling the pixel component values of the second matrix can both effect filtering by a factor of two both horizontally and vertically.

The coding arrangement can include further means by which the coding of the difference values into digital data consists in quantizing these difference values into a smaller number of quantization levels, including zero, and coding these coarsely quantized difference values using a run-length code.

The coding arrangement can include a still further means by which the coding of the pixel component values of the fourth matrix into digital data includes delta coding these pixel component values.

In order that the invention may be more fully understood reference will now be made by way of example to the accompanying drawings, of which:

DETAILED DESCRIPTION OF THE PREFERRED EMBODIMENTS

Figure 3:
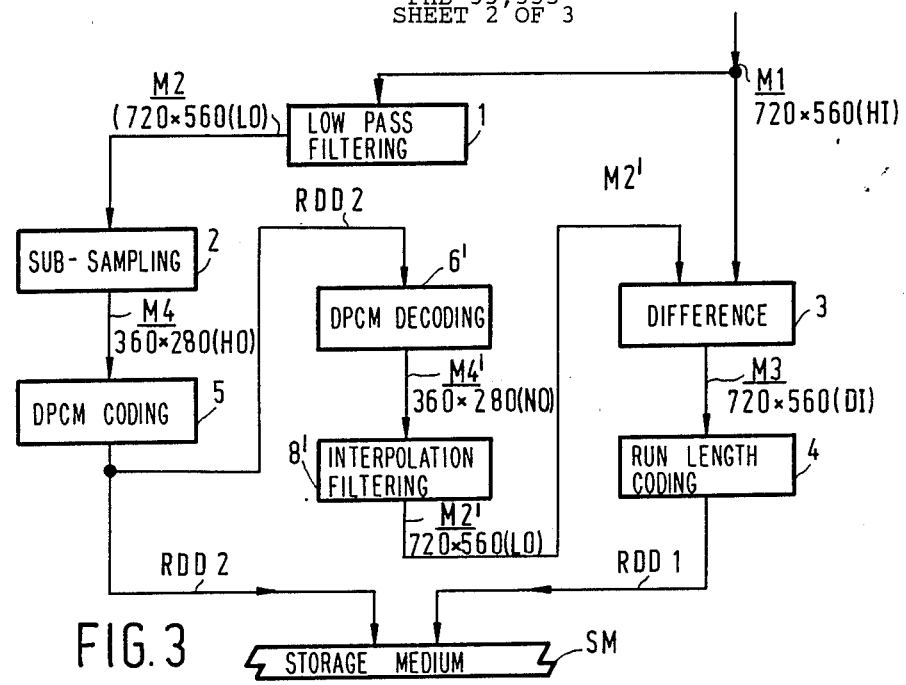
FIG. 3 represents diagrammatically a coding method according to the invention.

Referring to the drawings, the representative diagram in FIG. 3, of the coding method according to the invention, shows a low-pass filtering step 1, a sub-sampling step 2, a difference step 3, a first coding step 4 and a second coding step 5. Pixel information for at least one component value of a plurality of pixels representing an image is applied to the low-pass filtering step 1 and also to the difference step 3. This pixel information is assumed by way of illustrative example to comprise a first matrix M1 of 720×560 pixel component values (HI). This pixel information is in respect of an enhanced resolution display which would be better than both standard 635 line camera resolution and studio quality and would require a high definition television screen for displaying the image concerned at full resolution.

Figure 1:
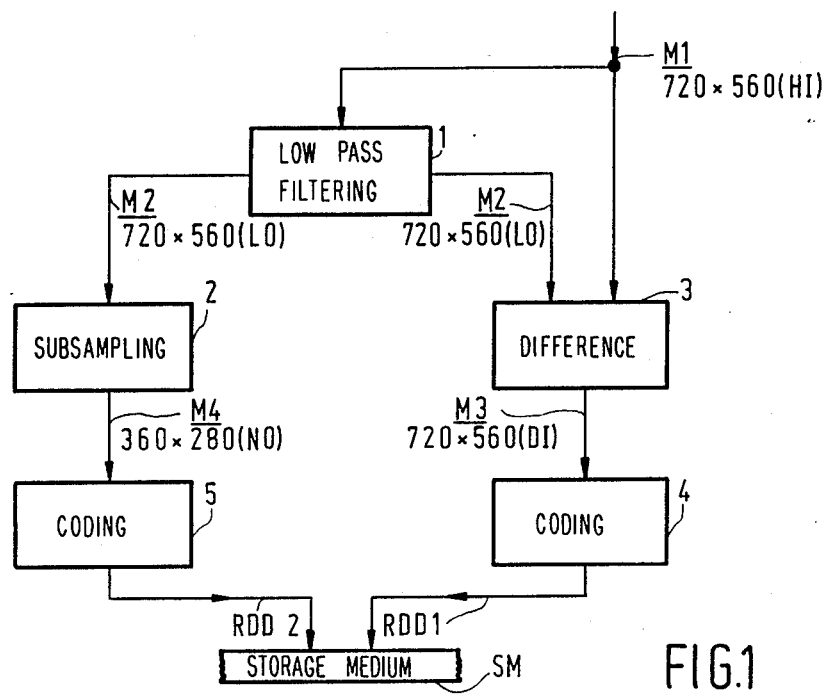
FIG. 1, as aforesaid represents diagrammatically Applicant's prior coding method.

The low-pass filtering step 1 effects low pass filtering to produce a second matrix M2 of 720×560 pixel component values (LO) which are in respect of a lower resolution image compared with the pixel component values of the first matrix M1. The coding method so far described corrresponds to the prior coding method represented in FIG. 1, and identical steps in the two coding methods have been given the same reference numbers for the sake of convenience. In the present coding method it is not the second matrix M2 which is used in the difference step 3, but instead a restituted second matrix M2' which is derived in the manner described below. The difference step 3 subtracts the restituted second matrix M2' from the first matrix M1, pixel-by-pixel, to produce a third matrix M3 of 720×560 difference values (DI) which are coded by the first coding step 4 into a first set of resultant digital data RDD1. The sub-sampling step 2 takes every second pixel component value of the second matrix M2, both horizontally and vertically, to produce a fourth matrix M4 of 360×280 pixel component values (NO) of reduced pixel density. The pixel information represented by this fourth matrix M4 is in respect of a normal resolution display. The second coding step 5 codes the pixel component values of the fourth matrix M4 into a second set of resultant digital data RDD2. The two sets of digital data RDD1 and RDD2 are available for storage on a suitable storage medium SM.

In order to derive the restituted second matrix M2', the second set of digital data RDD2 is applied to a decoding step 6' which is complementary to the coding step 5 and produces a decoded fourth matrix M4'. This decoded fourth matrix M4' is applied to an interpolation filtering step 8' which restitutes by interpolation the second matrix M2 as the matrix M2'.

Figure 2:
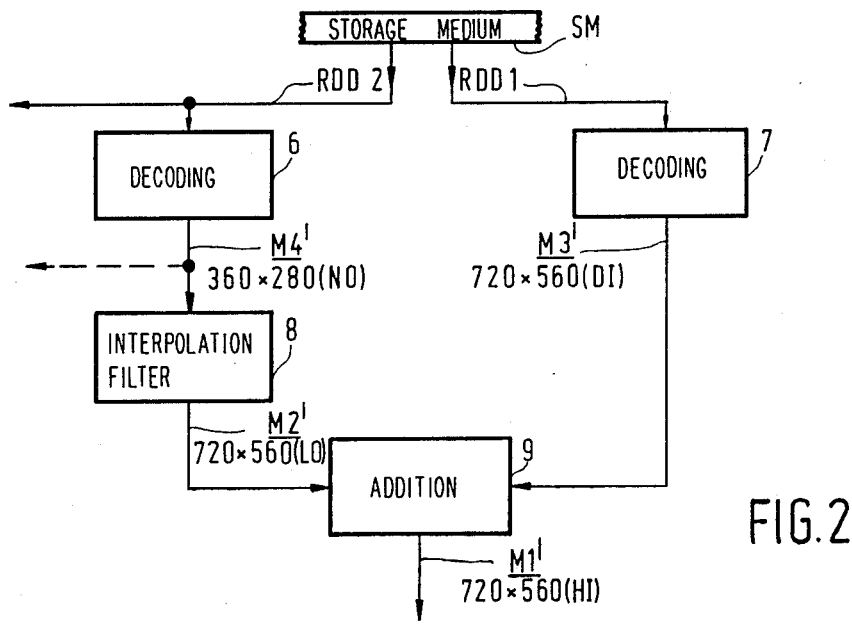
FIG. 2, as aforesaid, represents diagrammatically Applicant's prior decoding method.

The interpolation filtering step 8' is identical to that (8) used in the decoding method of FIG. 2 and, likewise, the decoding step 6' is identical to that (6) used in the decoding method of FIG. 2. As a consequence, in the coding method according to the invention, the difference step 3 is performed using, as the second matrix of pixel component values which are in respect of a lower resolution image, a restituted matrix which is identical to the restituted matrix which is subseqently to be used in the addition step of the decoding method. Therefore, as mentioned previously, the original pixel information of the matrix M1' which is restored by the decoding method is made independent of any errors introduced by the decoding step 6 and the interpolation filtering step 8 of the decoding method. Thus, the restored original pixel information of the matrix M1' is subject only to errors resulting from coding the third matrix M3 of difference values.

The pixel component values of all the matrices M1, M2, M2', M3 and M4 can be conventional pulse code modulated (PCM) data. The first coding step 4 can effect quantizing and run-length coding and the second coding step 5' can effect delta coding.

Figure 4:
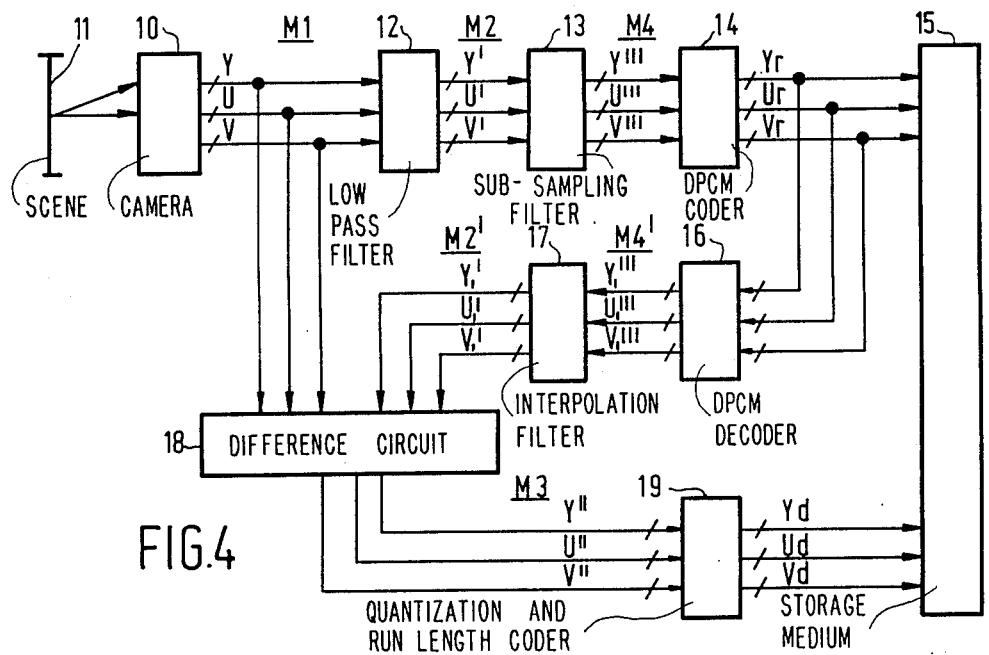
FIG. 4 shows diagrammatically a coding arrangement using the coding method of FIG. 3.

The coding arrangement shown in FIG. 4 comprises a video camera 10 for producing image samples of a scene 11. The camera 10 produces the image samples as pixel information in a matrix M1 of 720×560 discrete pixel values. Each of these pixel values is in three component values represented by 3×8-bit PCM codes using YUV coding, where Y is the luminance component of a pixel and U and V are the two chrominance components. The matrix M1 (and also each of the other matrices in the coding arrangement is therefore made up of three discrete sub-matrices one in respect of each of the pixel component values Y, U and V. This coding gives uncompressed natural pictures, 8 bits in depth for 256 colours, so that with 3×8 bits per pixel approximately 1210K 8-bit bytes storage capacity would be required for a full-screen picture. The coding arrangement achieves data compression which results in a considerable saving on this storage capacity, without any serious degrading of picture quality.

The YUV signal codes are applied to a low-pass filter 12 which filters these signal codes. The result is lower resolution pixel information in a matrix M2 of 720×560 discrete pixel values which are still represented by 3×8-bit PCM codes using YUV coding.

The Y'U'V' signal codes from the filter 12 are applied to a sub-sampling filter 13 which is operable to filter out every second pixel value of the matrix M2 both horizontally and vertically to produce low resolution pixel information in a matrix M4 of 360×280 pixel values which are still represented by 3×8-bit PCM codes using YUV coding. The Y'''U'''V''' signal codes from the filter 13 are applied to a delta PCM (DPCM)coder 14. The resulting signal codes Yr, Ur, Vr constitute a first set of digital data which is stored on a storage medium 15.

The resulting signal codes Yr,Ur,Vr from the coder 14 are also applied to a decoder 16 which is a DPCM decoder and is operable to produce a decoded matrix M4' of 360×280 pixel values as represented by the $Y_1''',U_1''',V_1'''$ signal codes. these signal codes are applied to an interpolation filter 17 which is operable to produce a restituted matrix M2' of 720×560 pixel values as represented by the $Y_1',U_1',V_1'$ signal codes. These latter signal codes are applied to a difference circuit 18. The difference circuit 18 also has applied to it the YUV signal codes from the camera 10 and is operable to subtract pixel-by-pixel the pixel values in the matrix M2' from the pixel values in the matrix M1. The result is a matrix M3 of 720×560 pixel difference values which are still represented by 3×8-bit PCM codes using YUV coding. The Y''U''V'' signal codes from the difference circuit 18 are applied to a quantization and run-length coder 19, where they are quantized into a small number of quantization levels, including zero, and the resulting coarsely quantized difference values are run-length coded. The resulting signal codes Yd, Ud, Vd constitute a second set of digital data which is stored on the storage medium 15.

The storage medium 15 is suitably an optical record carrier (i.e. a compact disc) which serves as a read-only memory to provide permanent storage of the digital data. The digital data would be reformatted (by suitable reformatting means not shown) prior to storage to make it compatible with the storage requirements for compact discs. This reformatting is known in the art and can involve block-type and/or convolution-type coding, using e.g. Reed/Solomon codes, to implement error detection and correction of the stored digital data. GB Application 8507248 gives an example of such coding techniques.

Figure 5:
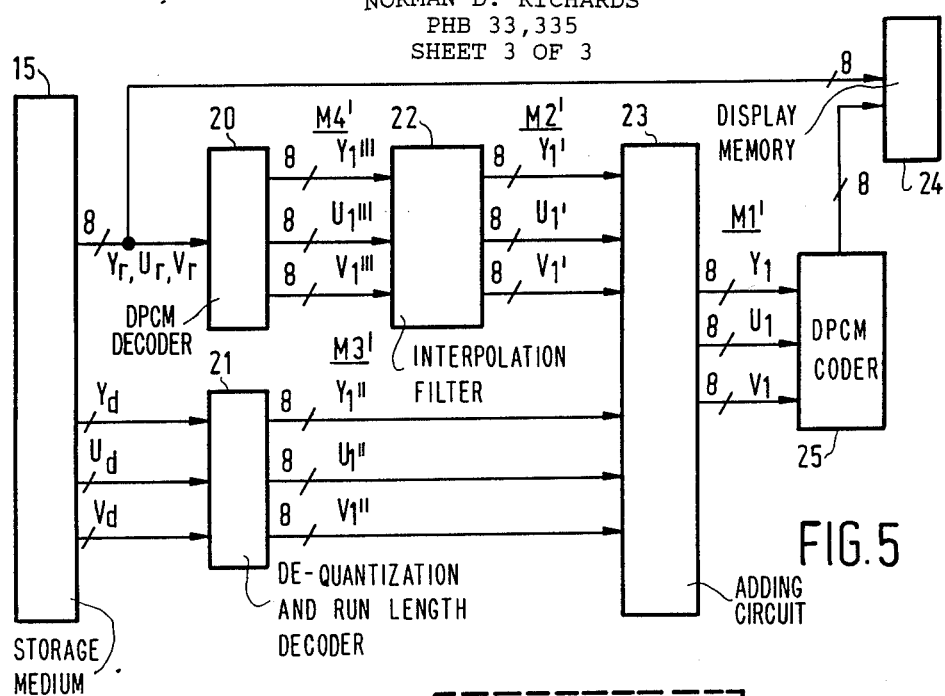
FIG. 5 shows diagrammatically a decoding arrangement using Applicant's prior decoding method of FIG. 2.

For the sake of completeness, a decoding arrangement for performing the decoding method of FIG. 2 is shown in FIG. 5. This decoding arrangement comprises two decoders 20 and 21 for receiving from the storage medium 15, in respect of an image to be displayed, a respective one of two sets of digital data (following de-reformatting of this digital data). The decoder 20 is a DCPM decoder and receives the set of digital data representing the resultant, Yr,Ur,Vr, signal codes as produced by the coder 14 of the coding arrangement of FIG. 4. the output from the decoder 20 is the decoded matrix M4' of 360×280 pixel values as represented by the $Y_1''',U_1''',V_1'''$ signal codes. These signal codes are applied to an interpolation filter 22 which is operable to produce a restituted matrix M2' of 720×560 pixel values as represented by the $Y_1',U_1',V_1'$ signal codes. These latter signal codes are applied to an adding circuit 23.

The decoder 21 is a de-quantization and run-length decoder and receives the set of digital data representing the resultant difference codes Yd,Ud,Vd as produced by the coder 19 of the coding arrangement of FIG. 4. The output from the decoder 21 is the restituted matrix M3' of pixel difference values as represented by $Y_1'',U_1'',V_1''$ signal codes. These signal codes are also applied to the adding circuit 23, the resulting output from which is the restituted matrix M1' of 720×560 pixel values as represented by the $Y_1,U_1,V_1$ signal codes.

There is also shown in FIG. 5 a display memory 24 of a data display apparatus in which the decoding arrangement may be embodied. It is assumed that this display memory 24 requires the digital codes which represent the pixels of an image to be displayed to be in DPCM form. Accordingly, the $Y_1,U_1,V_1$ signal codes at the output of the combining circuit 23 are DPCM coded in a coder 25 and the resultant DPCM codes are written into the display memory 24 as the pixel information for a high resolution display of 720×560 pixels. DPCM codes for a normal resolution display of 360×280 pixels are directly available from the storage medium 15 for writing into the display memory 24, that is the resultant Yr,Ur,Vr signal codes.

The article "The Laplacian Pyramid as a Compact Image Code", IEEE Transactions on Communications, Vol. COM-31, No. 4, April 1983, provides a theoretical background to an image coding technique pertaining to the present invention.

The publication "Philips Technical Review", Volume 40, 1982, No. 6, describes four articles on compact discs.

In the coding arrangement of FIG. 4 it has been assumed that pixel component values Y, U and V have been coded identically. However, because the chrominance components U and V have far less relevance than the luminance component Y in defining picture content, these chrominance components U and V can, in practice, be sampled horizontally at half the sampling rate that the luminance component Y is sampled. As a consequence, the matrices for the chrominance components U and V would have half the horizontal resolution compared with the matrices for the luminance component Y. As another alternative, the chrominance components U and V, with or without reduced sampling relative to the component Y, can be stored directly (after reformatting) on the storage medium using only delta coding and only the luminance component Y is coded as a combination of a matrix of low resolution Y values of reduced density and a matrix of values representing the difference between high resolution Y values and the low resolution Y values of full density.

Figure 6:
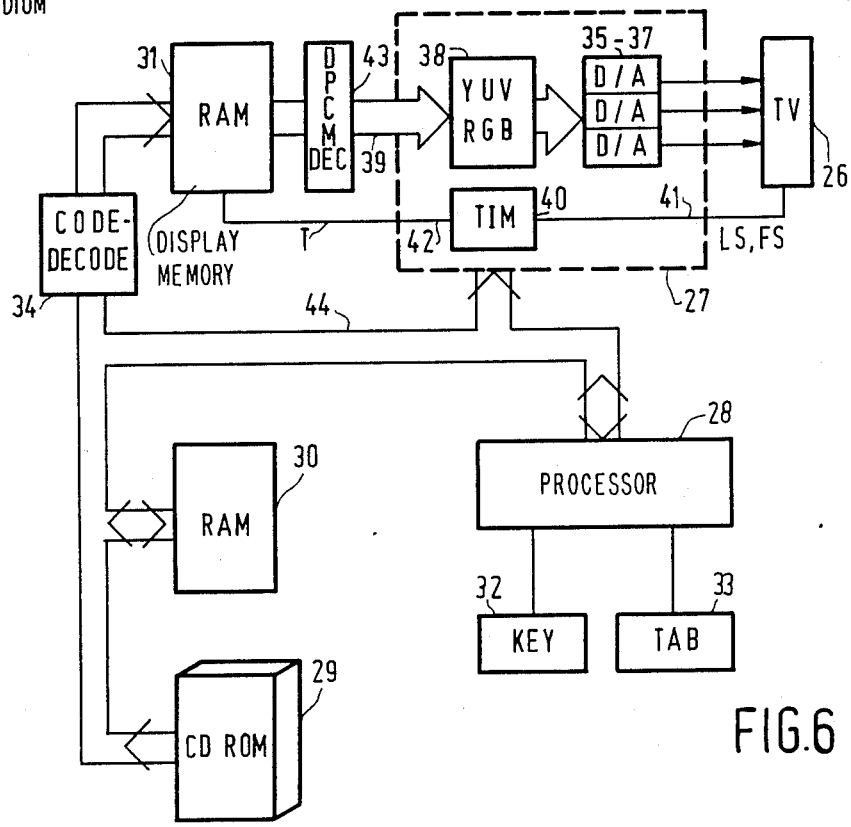
FIG. 6 shows diagrammatically an image display apparatus for utilising digital data which has been produced by a coding method according to the invention.

The image display apparatus shown in FIG. 6 comprises a display device 26, a display generator 27, a processor 28, a mass memory device 29, a program memory 30, a display memory 31, user interface apparatus 32 and 33, and a code-decode device 34 which includes a decoding arrangement of the form shown in FIG. 5. The display device 26 is suitably a colour television monitor which is connected to receive R,G,B video signals from the display generator 27. These r,g,b video signals are produced in the display generator 27 by three digital-to-analogue converters 35, 36 and 37, respectively. The display generator 27 also includes a YUV-RGB matrix converter 38 which is responsive to decoded digital data representing YUV values and received from the display memory 31 over a bus 39 to produce digital signals representing the RGB values for driving the converters 35, 36 and 37. A display timer 40 in the display generator 27 provides line and field synchronisation signals LS and FS for the television monitor 26 over a connection 41. The timer 40 also provides over a connection 42 timing signals T for controlling the read-out of digital data from the display memory 31.

The display memory 31 is a random-access memory which has a capacity for storing in DPCM form the digital data for at least one display image. A DPCM decoder 43 decodes the digital data read out from the display memory 31 prior to its application to the display generator 27. A combined address/data bus 44 interconnects the display generator 27 and the display memory 31 with the processor 28. The program memory 30, which is also at least partially a random-access memory, is also connected to the address/data bus 44. The program memory 30 contains permanent program data for controlling the "house-keeping" operations of the processor 28. The user interface apparatus comprises a keyboard data entry device 32 and a graphics tablet 33. The processor 28 can be a commercially available microprocessor, for instance the Signetics S68000 µP.

The mass memory device 29 is a compact disc device and is also connected to the address/data bus 44. Digital data which is read out from the device 29 under the control of the processor 28 is de-reformatted, decoded and recoded into DPCM form by the device 34 and written into the display memory 31.

From reading the present disclosure, other modifications will be apparent to persons skilled in the art. Such modifications may involve other features which are already known per se and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation or modification thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

I claim:

1. A method of image coding by which pixel information for at least one pixel component value of m by n pixels forming a rectangular image is coded into digital data, where m is an integer representing the number of pixels vertically and n is an integer representing the number of pixels horizontally in said image, comprising the steps of:
    (i) arranging said pixel information as a first matrix of m×n pixel component values, (ii) low-pass filtering these pixel component values of the first matrix to produce a second matrix of m×n pixel component values which are in respect of a lower resolution image compared with the pixel component values of the first matrix, (iii) sub-sampling said second matrix of pixel component values to produce a fourth matrix of m/a×n/b pixel component values of reduced density, where a and b are factors of m and n, respectively, and (iv) coding said fourth matrix of pixel component values into a second set of digital data utilizing a code relating the value of each pixel component in said fourth matrix to the component value of an adjoining pixel;

said method being characterised by comprising the further steps of:

(v) decoding the second set of digital data representing the pixel component values of reduced density to reconstitute the fourth matrix of pixel component values, (vi) interpolation filtering said fourth matrix of pixel component values to restitute said second matrix of pixel component values, (vii) subtracting the restituted second matrix from the first matrix pixel-by-pixel to produce a third matrix of m×n difference values, and (viii) coding said third matrix of difference values into a first set of digital data.

2. A coding method as claimed in claim 1, including the further step (ix) of recording the first and second sets of digital data onto a storage medium in a manner that said data sets may thereafter be separately read from said medium.

3. A coding method as claimed in claim 1 or claim 2, wherein the sub-sampling of the pixel component values of the second matrix in step (iii) is such that a=b=2.

4. A coding method as claimed in claim 1 or claim 2, in which the coding of the difference values into the first set of digital data comprises quantizing these difference values into a smaller number of quantization levels, including zero, and coding the quantized values using a run-length code.

5. A coding method as claimed in claim 1 or claim 2, in which the coding of the pixel component values of the fourth matrix into the second set of digital data consists in delta coding these pixel component values.

6. An optical record carrier having stored thereon said first and second sets of digital data coded by the method of claim 2.

7. A method of cording as claimed in claim 1, wherein said pixel information comprises Y, U and V, Y being the luminance component of a pixel and U and V being the two chrominance components, wherein said steps (i) through (iv) are performed for these three pixel component values producing respective first, second and fourth matrices for each component, said fourth matrices being coded separately.

8. A method as claimed in claim 7, wherein the sub-sampling of the pixel component values of the second matrix in step (iii) is such that b, for each of the two chrominance components, is double b for the luminance component.

9. A coding apparatus by which pixel information for at least one pixel component value of m by n pixels forming a rectangular image is coded into digital data where m is an integer representing the number of pixels vertically and n is an integer representing the number of pixels horizontally in said image, comprising:

means for arranging said pixel information as a first matrix of m×n pixel component values, means for low-pass filtering these pixel component values of the first matrix to produce a second matrix of m×n pixel component values, which are in respect of a lower resolution image compared with the pixel component values of the first matrix, means for sub-sampling said second matrix of pixel component values to produce a fourth matrix of m/a×n/b pixel component values of reduced density, where a and b are factors of m and n, respectively, means for coding said fourth matrix of pixel component values into a second set of digital data utilizing a code relating the value of each pixel component in said fourth matrix to the component value of an adjoining pixel, means for decoding the second set of digital data to reconstitute the fourth matrix of pixel component values, means for interpolation filtering said reconstituted fourth matrix of pixel component values to restitute said second matrix of pixel component values, means for subtracting the restituted second matrix from the first matrix pixel-by-pixel to produce a third matrix of m×n difference values, and means for coding said third matrix of difference values into a first set of digital data.

10. A coding apparatus as claimed in claim 9, wherein a=b=2 said low-pass filtering means and said sub-sampling means effect filtering by a factor of two both horizontally and vertically.

11. A coding apparatus as claimed in claim 9, in which the means for coding said matrix of difference values quantizes these difference values into a smaller number of quantization levels, including zero, and codes the quantized values using a run-length code.

12. A coding apparatus as claimed in claim 9, 10, or 11, in which the means for coding the pixel component values of the fourth matrix delta codes these pixel component values.

13. A coding apparatus as claimed in claim 9 including a storage medium and means responsive to said means for coding said third and fourth matrixes for recording said first and second sets of digital data on said storage medium in a manner that said data sets may be separately read from said medium.

14. A coding apparatus as claimed in claim 13, wherein said storage medium is an optical record carrier and said recording means is an associated optical write device.

15. A coding apparatus as claimed in claim 9, for use with YUV coding, where Y is the luminance component of a pixel and U and V are the two chrominance components, wherein all these pixel component values are coded separately starting with respective first matrices.

16. A coding apparatus as claimed in claim 15, wherein the first matrix of each of the two chrominance component values has half the horizontal resolution of the first matrix for the luminance component value.

17. A coding apparatus as claimed in claim 9, for use with YUV coding, where Y is the luminance component of a pixel and U and V are the two chrominance components, wherein only the luminance component value is said picture information and is coded, the two chrominance component values being available directly for storage on a storage medium.

* * * * *